(12) United States Patent
Okabe et al.

(10) Patent No.: US 10,786,934 B2
(45) Date of Patent: Sep. 29, 2020

(54) METHOD FOR MANUFACTURING HOLLOW ARTICLE

(71) Applicant: DENSO CORPORATION, Kariya, Aichi-pref. (JP)

(72) Inventors: Sayaka Okabe, Kariya (JP); Tsuyoshi Arai, Kariya (JP); Manabu Ishiguro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 212 days.

(21) Appl. No.: 15/776,419

(22) PCT Filed: Sep. 13, 2016

(86) PCT No.: PCT/JP2016/076883
§ 371 (c)(1),
(2) Date: May 16, 2018

(87) PCT Pub. No.: WO2017/086001
PCT Pub. Date: May 26, 2017

(65) Prior Publication Data
US 2018/0370098 A1    Dec. 27, 2018

(30) Foreign Application Priority Data
Nov. 18, 2015 (JP) .............................. 2015-225734

(51) Int. Cl.
*B29C 45/16* (2006.01)
*B29C 45/06* (2006.01)
(Continued)

(52) U.S. Cl.
CPC ...... *B29C 45/1615* (2013.01); *B29C 45/0062* (2013.01); *B29C 45/06* (2013.01);
(Continued)

(58) Field of Classification Search
CPC . B29C 45/06; B29C 45/062; B29C 2045/065; B29C 2045/067;
(Continued)

(56) References Cited

U.S. PATENT DOCUMENTS

2015/0076735 A1* 3/2015 Moyer, II .............. B29C 45/06
   264/297.3
2017/0348883 A1* 12/2017 Umezawa .............. B29C 45/06

FOREIGN PATENT DOCUMENTS

CN       104772847 A    7/2015
JP       S62087315 A    4/1987
(Continued)

*Primary Examiner* — Xiao S Zhao
*Assistant Examiner* — John J DeRusso
(74) *Attorney, Agent, or Firm* — Harness, Dickey & Pierce, P.L.C.

(57) ABSTRACT

A method includes a first molding process and a second molding process performed repeatedly. The first molding process includes injecting resin into a first pair of molds, in which a first pair of divided pieces is formed and which is fitted together without an inner mold, to couple the first pair of divided pieces to form a first hollow article at an injection station. The second molding process includes (i) injecting resin into a third pair of molds, which is fitted together with one inner mold interposed therebetween, to mold a third pair of divided pieces at the injection station, (ii) taking out the first hollow article from the first pair of molds at a removing station, and (iii) removing another inner mold from a second pair of molds while leaving a second pair of divided pieces between the second pair of molds at the setup station.

6 Claims, 11 Drawing Sheets

(51) Int. Cl.
*B29C 45/00* (2006.01)
*B29C 45/32* (2006.01)
*B29L 22/00* (2006.01)
*B29C 45/14* (2006.01)

(52) U.S. Cl.
CPC ...... *B29C 45/32* (2013.01); *B29C 2045/0072* (2013.01); *B29C 2045/067* (2013.01); *B29C 2045/14524* (2013.01); *B29C 2045/1617* (2013.01); *B29L 2022/00* (2013.01)

(58) Field of Classification Search
CPC ...... B29C 2045/14524; B29C 45/0062; B29C 2045/0072; B29C 45/0441; B29C 45/32; B29L 2022/00
See application file for complete search history.

(56) References Cited

FOREIGN PATENT DOCUMENTS

| | | |
|---|---|---|
| JP | H02165916 A | 6/1990 |
| JP | H10272656 A | 10/1998 |
| JP | 2000043100 A | 2/2000 |
| JP | 2003326551 A | 11/2003 |
| WO | WO-9511792 A1 * 5/1995 | ............. B29C 45/06 |

* cited by examiner

FIG. 4

| PROCESS | MOLD 1 | MOLD 2 | MOLD 3 | N |
|---|---|---|---|---|
| FIRST PRECEDING PROCESS | MOLDING DIVIDED PIECES (INJECTION STATION) | ON STANDBY (REMOVING STATION) | ON STANDBY (SETUP STATION) | 0 |
| SHIFTING PROCESS | | | | |
| SECOND PRECEDING PROCESS | ON STANDBY (REMOVING STATION) | POSITIONING INNER MOLD (SETUP STATION) | ON STANDBY (INJECTION STATION) | 0 |
| SHIFTING PROCESS | | | | |
| THIRD PRECEDING PROCESS | REMOVING INNER MOLD (SETUP STATION) | MOLDING DIVIDED PIECES (INJECTION STATION) | ON STANDBY (REMOVING STATION) | 0 |
| SHIFTING PROCESS | | | | |
| FIRST MOLDING PROCESS | COUPLING DIVIDED PIECES (INJECTION STATION) | ON STANDBY (REMOVING STATION) | POSITIONING INNER MOLD (SETUP STATION) | 0 |
| SHIFTING PROCESS | | | | |
| SECOND MOLDING PROCESS | TAKING OUT HOLLOW ARTICLE (REMOVING STATION) | REMOVING INNER MOLD (SETUP STATION) | MOLDING DIVIDED PIECES (INJECTION STATION) | 1 |
| SHIFTING PROCESS | | | | |
| FIRST MOLDING PROCESS | POSITIONING INNER MOLD (SETUP STATION) | COUPLING DIVIDED PIECES (INJECTION STATION) | ON STANDBY (REMOVING STATION) | 1 |
| SHIFTING PROCESS | | | | |
| SECOND MOLDING PROCESS | MOLDING DIVIDED PIECES (INJECTION STATION) | TAKING OUT HOLLOW ARTICLE (REMOVING STATION) | REMOVING INNER MOLD (SETUP STATION) | 2 |
| SHIFTING PROCESS | | | | |
| FIRST MOLDING PROCESS | ON STANDBY (REMOVING STATION) | POSITIONING INNER MOLD (SETUP STATION) | COUPLING DIVIDED PIECES (INJECTION STATION) | 2 |
| SHIFTING PROCESS | | | | |
| SECOND MOLDING PROCESS | REMOVING INNER MOLD (SETUP STATION) | MOLDING DIVIDED PIECES (INJECTION STATION) | TAKING OUT HOLLOW ARTICLE (REMOVING STATION) | 3 |
| SHIFTING PROCESS | | | | |
| FIRST MOLDING PROCESS | COUPLING DIVIDED PIECES (INJECTION STATION) | ON STANDBY (REMOVING STATION) | POSITIONING INNER MOLD (SETUP STATION) | 3 |
| SHIFTING PROCESS | | | | |
| SECOND MOLDING PROCESS | TAKING OUT HOLLOW ARTICLE (REMOVING STATION) | REMOVING INNER MOLD (SETUP STATION) | MOLDING DIVIDED PIECES (INJECTION STATION) | 4 |
| ⋮ | | | | |
| SECOND MOLDING PROCESS | TAKING OUT HOLLOW ARTICLE (REMOVING STATION) | REMOVING INNER MOLD (SETUP STATION) | MOLDING DIVIDED PIECES (INJECTION STATION) | Na-2 |
| SHIFTING PROCESS | | | | |
| FIRST SUBSEQUENT PROCESS | POSITIONING INNER MOLD (SETUP STATION) | COUPLING DIVIDED PIECES (INJECTION STATION) | ON STANDBY (REMOVING STATION) | Na-2 |
| SHIFTING PROCESS | | | | |
| SECOND SUBSEQUENT PROCESS | ON STANDBY (INJECTION STATION) | TAKING OUT HOLLOW ARTICLE (REMOVING STATION) | REMOVING INNER MOLD (SETUP STATION) | Na-1 |
| SHIFTING PROCESS | | | | |
| THIRD SUBSEQUENT PROCESS | ON STANDBY (REMOVING STATION) | POSITIONING INNER MOLD (SETUP STATION) | COUPLING DIVIDED PIECES (INJECTION STATION) | Na-1 |
| SHIFTING PROCESS | | | | |
| FOURTH SUBSEQUENT PROCESS | REMOVING INNER MOLD (SETUP STATION) | ON STANDBY (INJECTION STATION) | TAKING OUT HOLLOW ARTICLE (REMOVING STATION) | Na |

FIG. 10

| PROCESS | MOLD 1 | MOLD 2 | MOLD 3 | N |
|---|---|---|---|---|
| | | ⋮ | | |
| THIRD MOLDING PROCESS | ON STANDBY (REMOVING STATION) | MOLDING DIVIDED PIECES (INJECTION STATION) | POSITIONING INNER MOLD (SETUP STATION) | 0 |
| SHIFTING PROCESS | | | | |
| FOURTH MOLDING PROCESS | REMOVING INNER MOLD (SETUP STATION) | ON STANDBY (REMOVING STATION) | COUPLING DIVIDED PIECES (INJECTION STATION) | 0 |
| SHIFTING PROCESS | | | | |
| FIFTH MOLDING PROCESS | COUPLING DIVIDED PIECES (INJECTION STATION) | REMOVING INNER MOLD (SETUP STATION) | ON STANDBY (REMOVING STATION) | 0 |
| SHIFTING PROCESS | | | | |
| THIRD MOLDING PROCESS | TAKING OUT HOLLOW ARTICLE (REMOVING STATION) | COUPLING DIVIDED PIECES (INJECTION STATION) | REMOVING INNER MOLD (SETUP STATION) | 1 |
| SHIFTING PROCESS | | | | |
| FOURTH MOLDING PROCESS | POSITIONING INNER MOLD (SETUP STATION) | TAKING OUT HOLLOW ARTICLE (REMOVING STATION) | COUPLING DIVIDED PIECES (INJECTION STATION) | 2 |
| SHIFTING PROCESS | | | | |
| FIFTH MOLDING PROCESS | MOLDING DIVIDED PIECES (INJECTION STATION) | POSITIONING INNER MOLD (SETUP STATION) | TAKING OUT HOLLOW ARTICLE (REMOVING STATION) | 3 |
| SHIFTING PROCESS | | | | |
| THIRD MOLDING PROCESS | ON STANDBY (REMOVING STATION) | MOLDING DIVIDED PIECES (INJECTION STATION) | POSITIONING INNER MOLD (SETUP STATION) | 3 |
| SHIFTING PROCESS | | | | |
| FOURTH MOLDING PROCESS | REMOVING INNER MOLD (SETUP STATION) | ON STANDBY (REMOVING STATION) | MOLDING DIVIDED PIECES (INJECTION STATION) | 3 |
| SHIFTING PROCESS | | | | |
| FIFTH MOLDING PROCESS | COUPLING DIVIDED PIECES (INJECTION STATION) | REMOVING INNER MOLD (SETUP STATION) | ON STANDBY (REMOVING STATION) | 3 |
| SHIFTING PROCESS | | | | |
| THIRD MOLDING PROCESS | TAKING OUT HOLLOW ARTICLE (REMOVING STATION) | COUPLING DIVIDED PIECES (INJECTION STATION) | REMOVING INNER MOLD (SETUP STATION) | 4 |
| SHIFTING PROCESS | | | | |
| FOURTH MOLDING PROCESS | POSITIONING INNER MOLD (SETUP STATION) | TAKING OUT HOLLOW ARTICLE (REMOVING STATION) | COUPLING DIVIDED PIECES (INJECTION STATION) | 5 |
| SHIFTING PROCESS | | | | |
| FIFTH MOLDING PROCESS | MOLDING DIVIDED PIECES (INJECTION STATION) | POSITIONING INNER MOLD (SETUP STATION) | TAKING OUT HOLLOW ARTICLE (REMOVING STATION) | 6 |
| | | | | |

METHOD FOR MANUFACTURING HOLLOW ARTICLE

CROSS REFERENCE TO RELATED APPLICATIONS

This application is a U.S. National Phase Application under 35 U.S.C. 371 of International Application No. PCT/JP2016/076883 filed on Sep. 13, 2016 and published in Japanese as WO 2017/086001 A1 on May 26, 2017. This application is based on and claims the benefit of priority from Japanese Patent Application No. 2015-225734 filed on Nov. 18, 2015. The entire disclosures of all of the above applications are incorporated herein by reference.

TECHNICAL FIELD

The present disclosure relates to a method for manufacturing a hollow article. The method includes molding a pair of divided pieces using an inner mold and three pairs of a first mold and a second mold and coupling the pair of divided pieces to form the hollow article.

BACKGROUND ART

For example, a method for manufacturing a hollow article may provide a single hollow article, which defines a space therein, formed of a pair of divided pieces. In the method, an injection of resin into a die is performed twice.

Patent Literature 1 discloses a method referred to as a die-slide injection. In the method, a pair of divided pieces is molded by performing a first injection in which resin is injected between a movable mold and a fixed mold. Then, the movable mold and the fixed mold are opened so that one of the divided pieces is left in the movable mold and the other divided piece is left in the fixed mold. Subsequently, the movable mold is slid so that the two divided pieces face each other, and then a second injection in which resin is injected to couple the pair of divided pieces is performed. Thus, a hollow article having a uniform thickness is molded by performing the injection of resin twice.

PRIOR ART LITERATURES

Patent Literature

Patent Literature 1: JP S62-87315 A

SUMMARY OF INVENTION

A lead time in the method may be shortened by using a plurality of pairs of the movable mold and the fixed mold. However, the method using the pairs of molds necessarily includes injecting resin, inserting an inner mold between each pairs of the movable mold and the fixed mold, and curing the resin. In a case of using the pairs of the movable mold and the fixed mold, a quantity of the hollow articles provided per unit time may not be uniform when the manufacturing steps are combined inappropriately. When the hollow articles are provided at un-equal intervals, subsequent manufacturing steps using the hollow articles may be performed inappropriately.

The present disclosure addresses the above-described issues, and it is an objective of the present disclosure to provide a method for manufacturing a hollow article, the method that can uniform a quantity of the hollow article provided per unit time and can shorten a lead time by using three pairs of first mold and a second mold.

In at least one aspect of the present disclosure, a method for manufacturing a hollow article uses at least one inner mold and first, second and third pairs of molds each of which is a pair of a first mold and a second mold. The method includes molding a pair of divided pieces and coupling the pair of divided pieces to form the hollow article. The method includes a first molding process and a second molding process performed repeatedly with a rotation process interposed therebetween. The first molding process includes (i) injecting resin into a clearance defined between the first pair of molds, in which a first pair of divided pieces is formed and which is fitted together without the inner mold, to couple the first pair of divided pieces to be a first hollow article at an injection station, (ii) inserting one inner mold between the third pair of molds at a setup station, (iii) holding the second pair of molds, between which another inner mold is interposed, at a removing station. In the rotation process, (i) one of the first, second and third pairs of molds located at the injection station is moved to the removing station, (ii) another one of the first, second and third pairs of molds located at the removing station is moved to the setup station, and (iii) a remaining one of the first, second and third pairs of molds located at the setup station is moved to the injection station. The second molding process includes (i) injecting resin into a clearance defined between the third pair of molds, which is fitted together with the one inner mold interposed therebetween, to mold a third pair of divided pieces at the injection station, (ii) taking out the first hollow article from the first pair of molds at the removing station, and (iii) removing another inner mold from the second pair of molds while leaving a second pair of divided pieces between the second pair of molds at the setup station.

According to the above-described method, in the second molding process, one pair of divided pieces is molded by one of the three pairs of molds at the injection station while one hollow article is taken out from another one of the three pairs of molds at the removing station. In the first molding process performed again after the second molding process with the rotation process interposed therebetween, another pair of divided pieces is coupled to be another hollow article in the remaining one of the three pairs of molds at the injection station while curing the one pair of divided pieces by holding the one of the three pairs of molds at the removing station. Thus, by performing the first molding process and the second molding process repeatedly with the rotation process interposed therebetween, a quantity of the hollow articles provided per unit time can be uniform while the lead time can be shortened by using the three pairs of molds and the inner mold.

The present disclosure thus provides a method for manufacturing a hollow article, in which a quantity of the hollow articles provided per unit time can be uniform while the lead time can be shortened by using the three pairs of molds and the inner mold.

BRIEF DESCRIPTION OF DRAWINGS

The above and other objects, features and advantages of the present disclosure will become more apparent from the following detailed description made with reference to the accompanying drawings.

FIG. 4 is a process chart of the method according to the first embodiment.

FIG. 10 is a process chart of the method according to a comparative example.

DESCRIPTION OF EMBODIMENTS

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A method for manufacturing a hollow article P in a first embodiment will be described hereafter referring to FIG. 1 to FIG. 7. The hollow article P is a member defining a space P0 therein. For example, the hollow article P may be a component of an air flow meter that measures a flow rate of air and allows the air to flow through the hollow article P.

Figure 1:
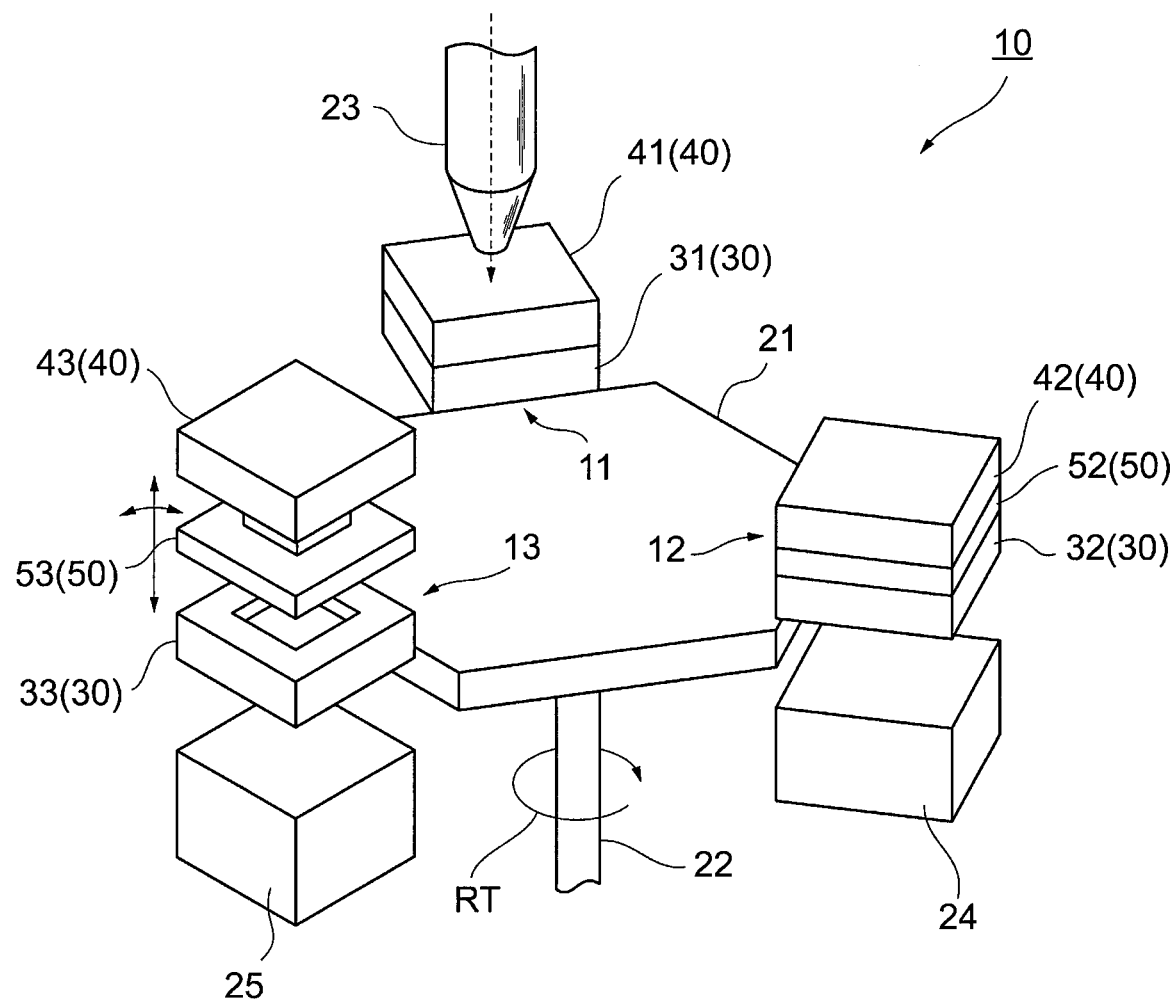
FIG. 1 is a perspective view of a molding device used in a method according to a first embodiment.

FIG. 1 is a perspective view illustrating a molding device 10 used in the method in the first embodiment. The molding device 10 includes a stage 21, a nozzle 23, a first, second and third pairs of movable mold 30 and fixed mold 40, and a first and second inner molds 50.

The stage 21 is a member having a flat plate shape having a thickness direction along a vertical direction. A rotary shaft 22 extending along the vertical direction is attached to a lower surface of the stage 21. The rotary shaft 22 is operated by an actuator (not shown) to rotate in a direction shown by arrow RT in FIG. 1. When the rotary shaft 22 rotates, the stage 21 rotates around the rotary shaft 22 in the same direction. The molding device 10 is configured to perform a rotation process that moves, e.g., the movable molds 30 by operating the actuator to rotate the stage 21 120° in the direction of the arrow RT at one time.

An injection station 11, a removing station 12, and a setup station 13 are attached to a rim of the stage 21 and spaced from each other at intervals of 120° in the direction of the arrow RT about the rotary shaft 22. The injection station 11, the removing station 12, and the setup station 13 refer to positions at which the respective steps described later are executed. In FIG. 1, the injection station 11 is illustrated behind the stage 21, the removing station 12 is illustrated on front-right of the stage 21, and the setup station 13 is illustrated on front-left of the stage 21.

Positions of the injection station 11, the removing station 12, and the setup station 13 are not changed by rotation of the stage 21. In other words, even when the stage 21 rotates about the rotary shaft 22, the relationship among the stations, in which the injection station 11 is behind the stage 21, the removing station 12 is on front-right of the stage 21, and the setup station 13 is on front-left of the stage 21 does not change.

The nozzle 23 is attached to the injection station 11. The nozzle 23 is a part of an injection machine (not shown) and an opening is formed in a lower end portion of the nozzle 23. Heated and molten resin is fed to the nozzle 23, and the nozzle 23 injects, from the opening, the resin between the movable mold 30 and the fixed mold 40 attached to the injection station 11.

The first, second and third pairs of movable mold 30 and fixed mold 40 mold the resin injected from the nozzle 23. The three movable molds 30 (or first molds) are fixed to the stage 21 by jigs (not shown). The three movable molds 30 are fixed to the sides of the stage 21 and separated from each other at intervals of 120° in the direction of the arrow RT around the rotary shaft 22. The three fixed molds 40 (or second molds) are positioned above the movable molds 30 respectively. In other words, the molding device 10 is configured so that one pair of movable mold 30 and fixed mold 40 is configured to be attached to each of the injection station 11, the removing station 12, and the setup station 13. The first, second and third pairs of movable mold 30 and the fixed mold 40 rotate integrally with the stage 21 as the stage 21 rotates in the direction of the arrow RT.

Each of the two inner molds 50 is a mold that is also referred to as a core and can be interposed between the movable mold 30 and the fixed mold 40 to be removable. The two inner molds 50 have the same shape.

Hereafter, the movable mold 30, the fixed mold 40 and the inner mold 50 attached to the injection station 11 will be referred to as a movable mold 31, a fixed mold 41 and an inner mold 51 respectively. The movable mold 30, the fixed mold 40 and the inner mold 50 attached to the removing station 12 will be referred to as a movable mold 32, a fixed mold 42 and an inner mold 52 respectively. The movable mold 30, the fixed mold 40 and the inner mold 50 attached to the setup station 13 will be referred to as a movable mold 33, a fixed mold 43, and an inner mold 53.

In other words, the movable mold 31, the fixed mold 41 and the inner mold 51 (not shown in FIG. 1), which are attached to the injection station 11, move to the removing station 12 in the rotation process and then become the movable mold 32, the fixed mold 42 and the inner mold 52 respectively. The movable mold 32, the fixed mold 42 and the inner mold 52, which are attached to the removing station 12, move to the setup station 13 and then become the movable mold 33, the fixed mold 43 and the inner mold 53 respectively. Also, the movable mold 33, the fixed mold 43 and the inner mold 53, which are attached to the setup station 13, move to the injection step 11 and then become the movable mold 31, the fixed mold 41 and the inner mold 51 respectively.

A removing mechanism 24 is positioned below the removing station 12. The removing mechanism 24 has an actuator (not shown) and can separate the movable mold 32 and the fixed mold 42, which are attached to the removing station 12, from each other. Hereafter, an operation in which the movable mold 32 and the fixed mold 42 are separated from each other will be referred to as "a mold opening". The removing mechanism 24 can take out the hollow article P (described later) from a space defined between the movable mold 32 and fixed mold 42, which are opened in the mold opening.

A setup mechanism 25 is positioned below the setup station 13. The setup mechanism 25 has an actuator (not shown) and can place the inner mold 53 between the movable mold 33 and the fixed mold 43 attached to the setup station 13. Moreover, the setup mechanism 25 can take out the inner mold 53 from a space defined between the movable mold 33 and the fixed mold 43 attached to the setup station 13. The setup mechanism 25 can press the movable mold 33 and the fixed mold 43 against each other after placing the inner mold 53 and after taking out the inner mold 53. Hereafter, the operation in which the movable mold 33 and the fixed mold 43 are pressed against each other will be referred to as "a mold fitting". When the inner mold 53 is interposed between the movable mold 33 and the fixed mold 43, the movable mold 33 and the fixed mold 43 are pressed against each other while interposing the inner mold 53 therebetween.

Figure 2:
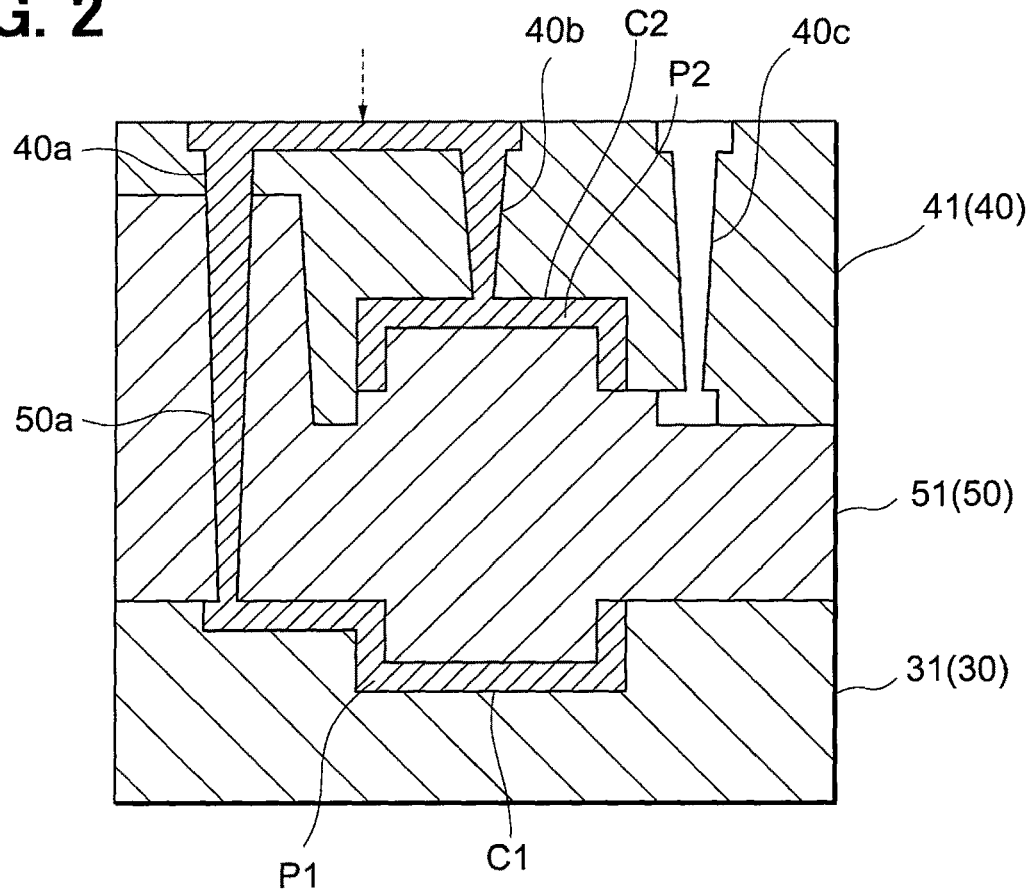
FIG. 2 is a cross-sectional view of a movable mold, a fixed mold and an inner mold according to the first embodiment.
Figure 3:
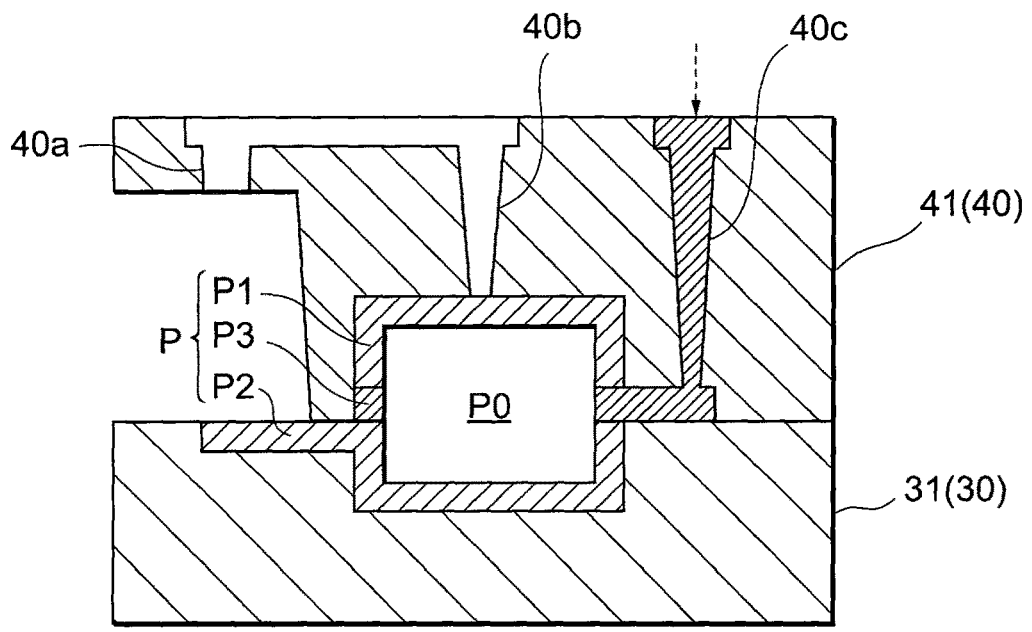
FIG. 3 is a cross-sectional view of the movable mold and the fixed mold according to the first embodiment.

FIG. 2 and FIG. 3 show cross sections of the movable mold 30 and the fixed mold 40 fitted together. The cross sections are taken along the vertical direction. FIG. 2 shows the movable mold 31 in a step for molding a pair of divided pieces P1 and P2. FIG. 3 shows the movable mold 31 in a step for coupling the pair of divided pieces P1 and P2 to form the hollow article P.

As shown in FIG. 2, a clearance C1 and a clearance C2 are defined between the inner mold 50 and the pair of the movable mold 30 and the fixed mold 40 when the movable mold 30 and the fixed mold 40 are fitted together with the inner mold 50 interposed therebetween. Specifically, the clearance C1 is formed between an upper surface of the movable mold 31 and a lower surface of the inner mold 51. The clearance C2 is formed between a lower surface of the fixed mold 41 and an upper surface of the inner mold 51.

The fixed mold 40 defines flow paths 40$a$, 40$b$, 40$c$ extending along the vertical direction therein. The flow paths 40$a$ and 40$b$ are blanched. The fixed mold 40 is configured to supply resin to the flow paths 40$a$, 40$b$ and the flow path 40$c$ selectively by using a mechanism (not shown). The inner mold 50 defines a flow path 50$a$ therein. The flow path 50$a$ is in communication with the flow path 40$a$ formed in the fixed mold 40.

When the resin is injected from the nozzle 23 (not shown in FIG. 2) while the inner mold 51 is interposed between the movable mold 31 and the fixed mold 41, the resin flows into the flow paths 40$a$ and 40$b$ of the fixed mold 41. The resin supplied into the flow path 40$a$ flows into the clearance C1 through the flow path 50$a$ of the inner mold 51. In other words, the flow path 40$a$ and the flow path 50$a$ serve as a runner through which the resin flows into the clearance C1. When the resin in the clearance C1 is cured, the divided piece P1 is molded.

On the other hand, the resin flowing into the flow path 40$b$ flows into the clearance C2. In other words, the flow path 40$b$ serves as a runner through which the resin flows into the clearance C2. When the resin in the clearance C2 is cured, the divided piece P2 is molded.

After the pair of divided pieces P1 AND P2 is molded, the movable mold 31, the fixed mold 41, and the inner mold 51 move to the setup station 13 via the removing station 12. At the setup station 13, the movable mold 33 and the fixed mold 43 are opened, and the inner mold 53 is removed while the pair of divided pieces P1 and P2 is left in the movable mold 33 and the fixed mold 43 respectively. Subsequently, the movable mold 33 and the fixed mold 43 are fitted together again at the setup station 13, and move to the injection station 11 when the rotation process is performed.

FIG. 3 shows the movable mold 31 and the fixed mold 41 attached to the injection station 11 as described above. Since the movable mold 31 and the fixed mold 41 are fitted together without the inner mold 51 interposed therebetween, the two divided pieces P1 and P2 directly face each other.

In FIG. 3, when the resin is injected from the nozzle 23 (not shown), the resin is supplied into the flow path 40$c$ of the fixed mold 41. The resin flows through the flow path 40$c$ and flows into a clearance between the pair of divided pieces P1 and P2. In other words, the flow path 40$c$ serves as a runner through which the resin flows into the clearance where the two divided pieces P1 and P2 face each other. When the resin in the clearance between the pair of divided pieces P1 and P2 is cured, a junction P3 that couples the pair of divided pieces P1 and P2 is molded. The pair of divided pieces P1 and P2 forms the hollow article P defining the space P0 therein when bine coupled to be one piece by the junction P3.

FIG. 4 is a process chart for manufacturing more than one hollow article P with a quantity Na in total by using the molding device 10. The process chart shows processes performed in order from the top. In FIG. 4, the first, second and third pairs of movable mold 30 and fixed mold 40 used in the molding device 10 are referred to as a mold 1, a mold 2, and mold 3, respectively, and N represents a quantity of the hollow articles P manufactured by the time of each process.

The manufacturing process includes a first molding process and a second molding process performed repeatedly with the rotation process interposed therebetween. In the first molding process, one pair of divided pieces P1 and P2 is coupled to be one hollow article P at the injection station 11. In the second molding process, another pair of divided pieces P1 and P2 is molded at the injection station while taking out the one hollow article P at the removing station 12. At each time point where the hollow article P is taken out, the quantity of the hollow articles P manufactured in total increases by one.

The manufacturing process includes preceding processes performed in advance of the first molding process and the second molding process. The preceding processes include a first preceding process, a second preceding process, and a third preceding process.

Moreover, the manufacturing process further includes subsequent processes performed after the first molding process and the second molding process. The subsequent processes include a first subsequent process, a second subsequent process, a third subsequent process, and a fourth subsequent process.

Figure 5A:
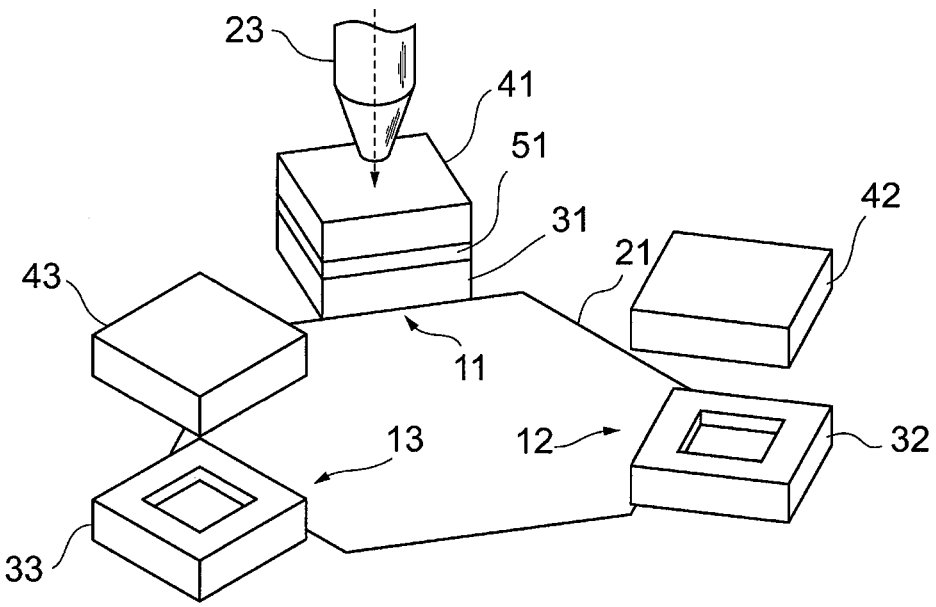
FIG. 5A is an explanatory diagram showing a first preceding process according to the first embodiment.
Figure 5B:
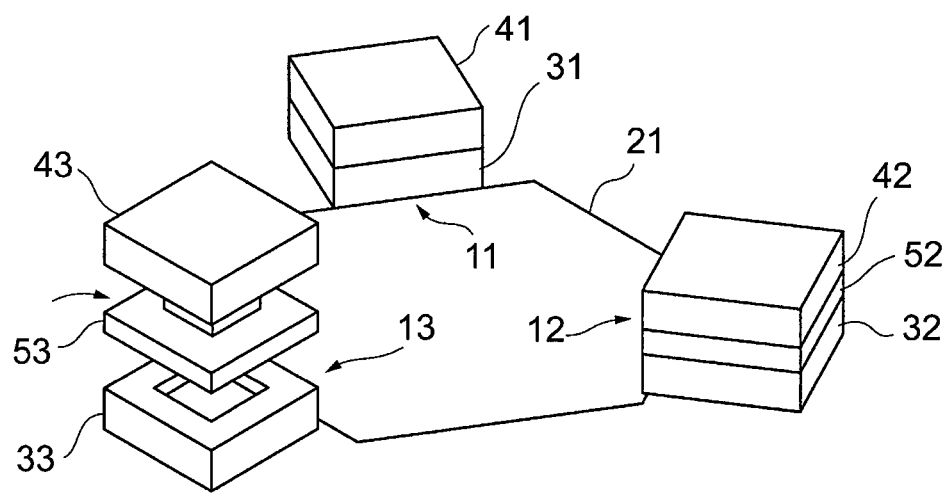
FIG. 5B is an explanatory diagram showing a second preceding process according to the first embodiment.
Figure 5C:
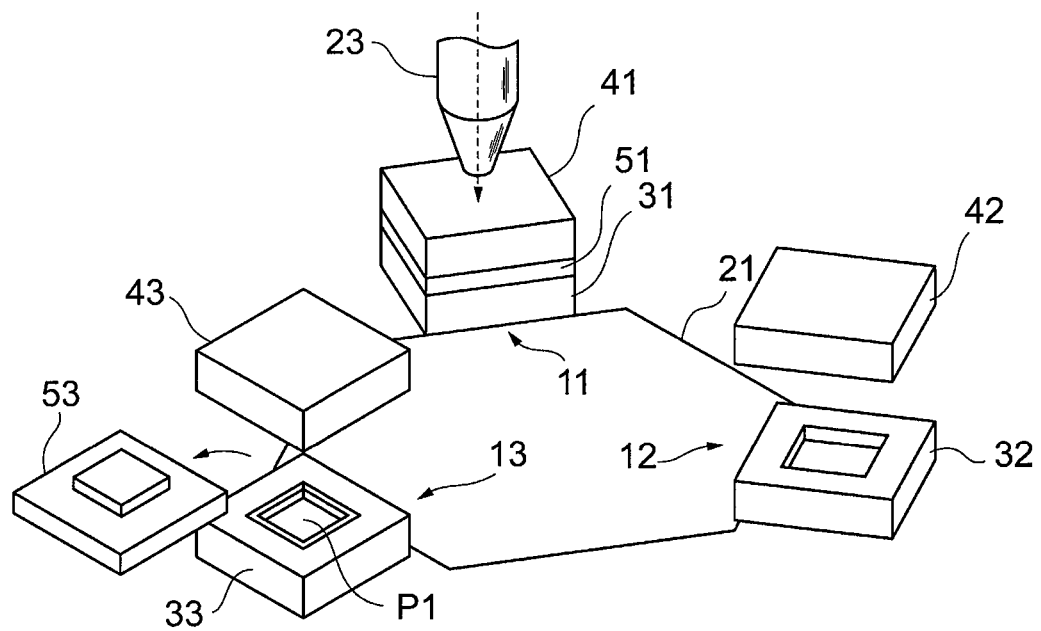
FIG. 5C is an explanatory diagram showing a third preceding process according to the first embodiment.

The preceding processes will be described referring to FIG. 5A, FIG. 5B and FIG. 5C. FIG. 5A illustrates the first preceding process, FIG. 5B illustrates the second preceding process, and FIG. 5C illustrates the third preceding process. Before the first preceding process is performed, the pair of divided pieces P1 and P2 and the hollow article P are not formed between any pair of the movable mold 30 and the fixed mold 40.

The first preceding process shown in FIG. 5A includes molding the divided pieces P1 and P2 by injecting resin into a clearance defined between the movable mold 31 and the fixed mold 41 fitted together with the inner mold 51 interposed therebetween at the injection station 11. The pair of the movable mold 31 and the fixed mold 41 corresponds to the "mold 1" shown in FIG. 4.

The first preceding process includes holding the movable mold 32 and the fixed mold 42 at the removing station 12. In other words, no special operation is performed for the movable mold 32 and the fixed mold 42 at the removing station 12. The pair of the movable mold 32 and the fixed mold 42 corresponds to the "mold 2" shown in FIG. 4.

The first preceding process includes holding the movable mold 33 and the fixed mold 43 at the setup station 13. In other words, no special operation is performed for the movable mold 33 and the fixed mold 43 at the removing station 12. The pair of the movable mold 33 and the fixed mold 43 corresponds to the "mold 3" shown in FIG. 4.

The rotation process is performed after the first preceding process. Specifically, the movable mold 31 and the fixed mold 41 move from the injection station 11 to the removing station 12 together with the inner mold 51 and the pair of divided pieces P1 and P2. The movable mold 32 and the fixed mold 42 move from the removing station 12 to the setup station 13. The movable mold 33 and the fixed mold 43 move from the setup station 13 to the injection station 11. The second preceding process is performed after the rotation process.

In the second preceding process shown in FIG. 5B, the movable mold 31 and the fixed mold 41 are on standby at the injection station 11. In other words, the nozzle 23 does not inject resin into a clearance defined between the movable mold 31 and the fixed mold 41. The movable mold 31 and the fixed mold 41, which correspond to the "mold 3" shown in FIG. 4, have been attached to the setup station 13 in the above-described first preceding process.

In the second preceding process, the movable mold 32 and the fixed mold 42 are on standby at the removing station 12. In other words, no special operation is performed for the movable mold 33 and the fixed mold 43 at the removing station 12. The movable mold 32 and the fixed mold 42, which correspond to the "mold 1" shown in FIG. 4, have been attached to the injection station 11 in the above-described first preceding process. Thus, curing the pair of divided pieces P1 and P2 formed between the movable mold 32 and the fixed mold 42 proceeds.

In the second preceding process, the inner mold 53 is interposed between the movable mold 33 and the fixed mold 43 at the setup station 13. The movable mold 33 and the fixed mold 43, which correspond to the "mold 2" shown in FIG. 4, have been attached to the removing station 12 in the above-described first preceding process.

The rotation process is performed after the above-described second preceding process. Specifically, the movable mold 31 and the fixed mold 41 move from the injection station to the removing station 12. The movable mold 32 and the fixed mold 42 move from the removing station 12 to the setup station 13 together with the inner mold 52 and the pair of divided pieces P1 and P2. The movable mold 33 and the fixed mold 43 move from the setup station 13 to the injection station 11 together with the inner mold 53. The third preceding process is performed after the rotation process.

The third preceding process shown in FIG. 5C includes molding the divided pieces P1 and P2 by injecting resin into a clearance defined between the movable mold 31 and the fixed mold 41 fitted together with the inner mold 51 interposed therebetween at the injection station 11. The movable mold 31 and the fixed mold 41, which correspond to the "mold 2" shown in FIG. 4, have been attached to the setup station 13 in the above-described second preceding process.

In the third preceding process, the movable mold 32 and the fixed mold 42 are on standby at the removing station 12. In other words, no special operation is performed for the movable mold 32 and the fixed mold 42 at the removing station 12. The movable mold 32 and the fixed mold 42, which correspond to the "mold 3" shown in FIG. 4, have been attached to the injection station 11 in the above-described second preceding process.

In the third preceding process, the inner mold 53 interposed between the movable mold 33 and the fixed mold 43 is removed at the setup station 13. The movable mold 33 and the fixed mold 43, which correspond to the "mold 1" shown in FIG. 4, have been attached to the removing station 12 in the above-described second preceding process. The inner mold 53 is taken out while the two divided pieces P1 and P2 are left in the movable mold 33 and the fixed mold 43 respectively.

The rotation process is performed after the above-described third preceding process. Specifically, the movable mold 31 and the fixed mold 41 move from the injection station 11 to the removing station 12 together with the inner mold 51 and the pair of divided pieces P1 and P2. The movable mold 32 and the fixed mold 42 move from the removing station 12 to the setup station 13. The movable mold 33 and the fixed mold 43 move from the setup station 13 to the injection station 11 together with the pair of divided pieces P1 and P2. The rotation process is performed before each of the first molding process and the second molding process.

Figure 6A:
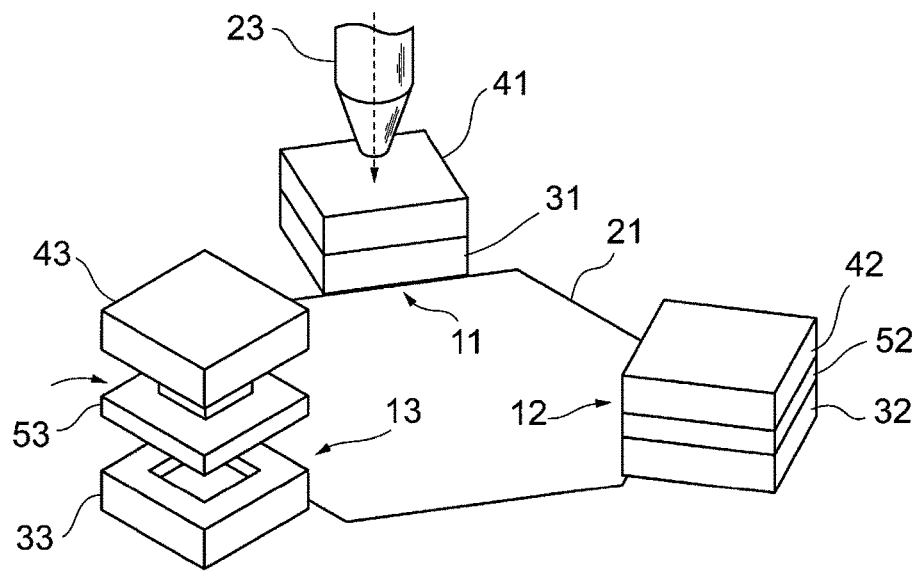
FIG. 6A is an explanatory diagram showing a first molding process according to the first embodiment.
Figure 6B:
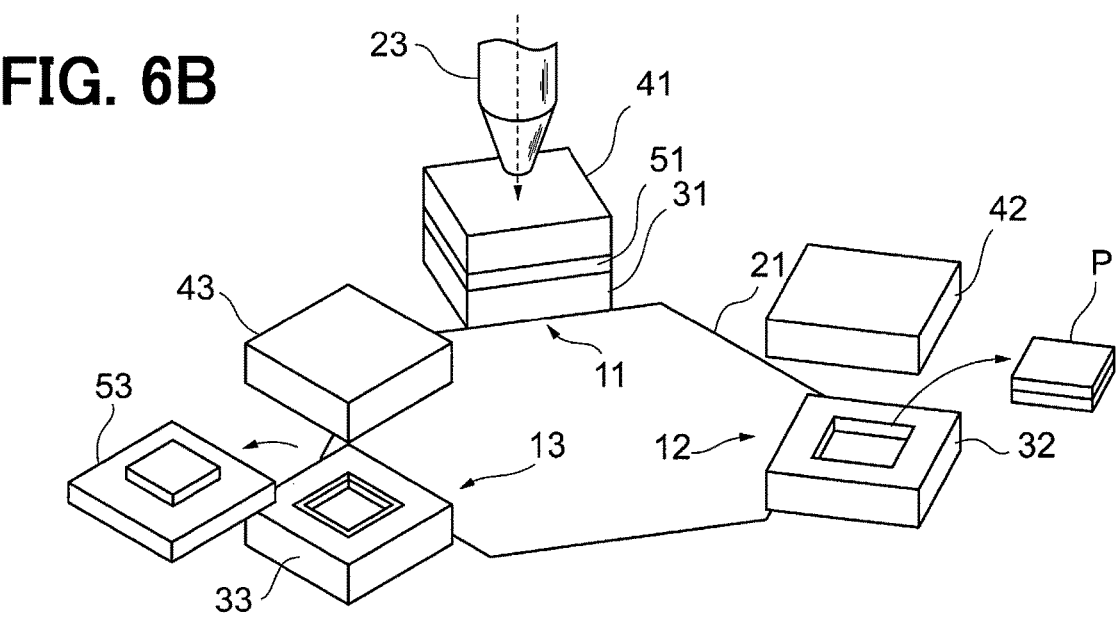
FIG. 6B is an explanatory diagram showing a second molding process according to the first embodiment.

The first molding process and the second molding process will be described with reference to FIGS. 6A and 6B. FIG. 6A illustrates the first molding process and FIG. 6B illustrates the second molding process.

In the first molding process shown in FIG. 6A, the resin is injected between the movable mold 31 and the fixed mold 41 at the injection station 11. The movable mold 31 and the fixed mold 41, which correspond to the "mold 1" shown in FIG. 4, have been attached to the setup station 13 in the above-described third preceding process. The pair of divided pieces P1 and P2 molded in the above-described first preceding process is interposed between the movable mold 31 and the fixed mold 41. Therefore, as a result of injecting resin in the first molding process, the pair of divided pieces P1 and P2 is coupled to each other to form the hollow article P.

In the first molding process, the movable mold 32 and the fixed mold 42 are on standby at the removing station 12. In other words, no special operation is performed for the movable mold 32 and the fixed mold 42 at the removing station 12. The movable mold 32 and the fixed mold 42, which correspond to the "mold 2" shown in FIG. 4, have been attached to the injection station 11 in the above-described third preceding process. Thus, curing the pair of divided pieces P1 and P2 formed between the movable mold 32 and the fixed mold 42 proceeds.

In the first molding process, the inner mold 53 is interposed between the movable mold 33 and the fixed mold 43 at the setup station 13. The movable mold 33 and the fixed mold 43, which correspond to the "mold 3" shown in FIG. 4, have been attached to the removing station 12 in the above-described third preceding process.

The rotation process is performed after the above-described first molding process. As a result, the movable mold 31 and the fixed mold 41 move from the injection station 11 to the removing station 12 together with the hollow article P. The movable mold 32 and the fixed mold 42 move from the removing station 12 to the setup station 13 together with the inner mold 52 and the pair of divided pieces P1 and P2. The movable mold 33 and the fixed mold 43 move from the setup station 13 to the injection station 11 together with the inner mold 53. The second molding process is performed after the rotation process is performed.

In the second molding process shown in FIG. 6B, resin is injected into a clearance defined between the movable mold 31 and the fixed mold 41 fitted together with the inner mold 51 interposed therebetween at the injection station 11. The movable mold 31 and the fixed mold 41, which correspond to the "mold 3" shown in FIG. 4, have been attached to the setup station 13 in the above-described first molding process. Thus, the pair of divided pieces P1 and P2 is molded.

In the second molding process, the hollow article P interposed between the movable mold 32 and the fixed mold 42 is taken out at the removing station 12. The movable mold 32 and the fixed mold 42, which correspond to the "mold 1" shown in FIG. 4, have been attached to the injection station 11 in the above-described first molding process. Thus, another hollow article P is molded and the quantity N of manufactured hollow articles P increases by one.

In the second molding process, the inner mold 53 interposed between the movable mold 33 and the fixed mold 43 is removed at the setup station 13. The movable mold 33 and the fixed mold 43, which correspond to the "mold 2" shown in FIG. 4, have been attached to the removing station 12 in the above-described first molding process. The inner mold 53 is removed while the two divided pieces P1 and P2 are left in the movable mold 33 and the fixed mold 43 respectively.

The rotation process is performed after the above-described second molding process. Specifically, the movable mold 31 and the fixed mold 41 move from the injection station 11 to the removing station 12 together with the inner mold 51 and the pair of divided pieces P1 and P2. The movable mold 32 and the fixed mold 42 move from the removing station 12 to the setup station 13. The movable mold 33 and the fixed mold 43 move from the setup station 13 to the injection station 11. The first molding process is performed again after the rotation process is performed.

The molding device 10 repeatedly performs the first molding process and the second molding process with the rotation process interposed therebetween. As a result, one hollow article P is molded in each second molding process. When the quantity N of manufactured hollow articles P in total becomes Na−2 which is smaller than the total quantity Na by 2, the molding device 10 performs the rotation process and then performs the subsequent processes.

Figure 7A:
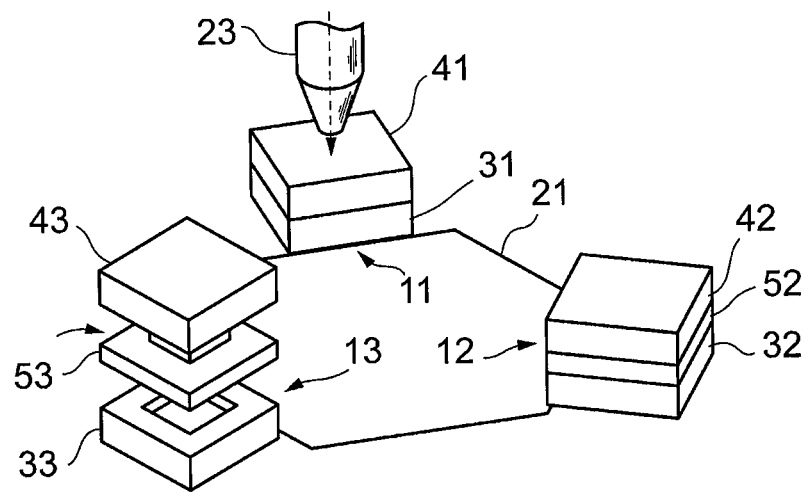
FIG. 7A is an explanatory diagram showing a first subsequent process according to the first embodiment.
Figure 7B:
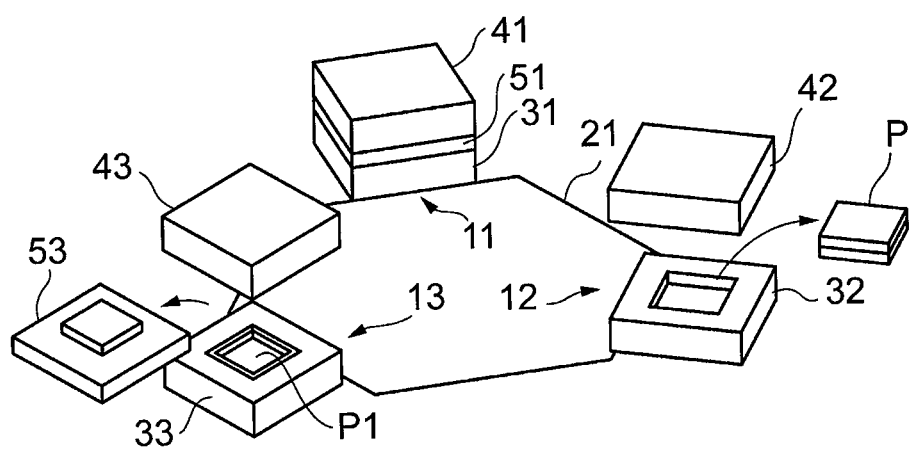
FIG. 7B is an explanatory diagram showing a second subsequent process according to the first embodiment.
Figure 7C:
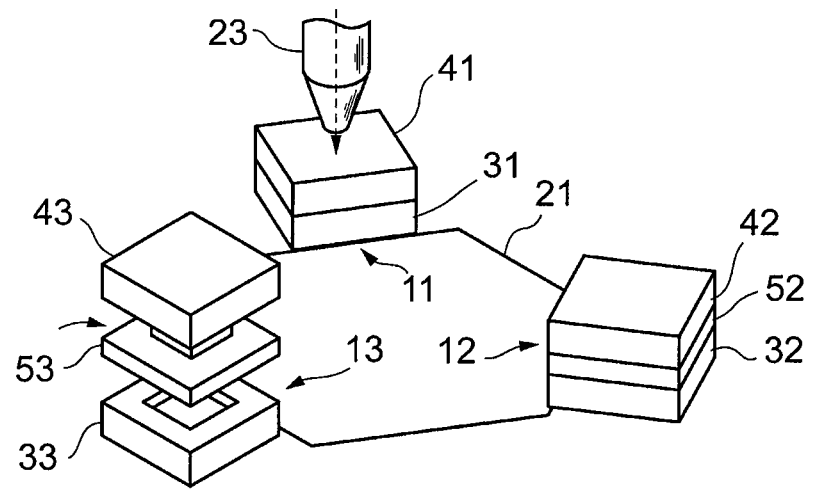
FIG. 7C is an explanatory diagram showing a third subsequent process according to the first embodiment.
Figure 7D:
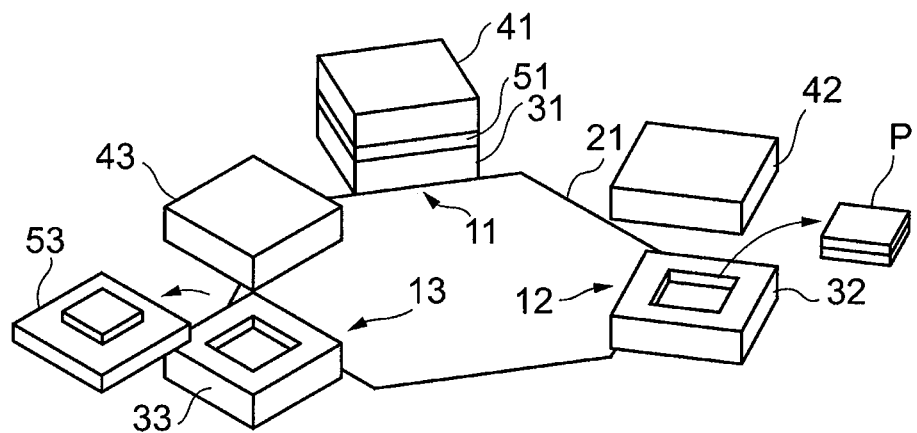
FIG. 7D is an explanatory diagram showing a fourth subsequent process according to the first embodiment.

The subsequent processes will be described with reference to FIG. 7A, FIG. 7B, FIG. 7C and FIG. 7D. FIG. 7A illustrates the first subsequent process, FIG. 7B illustrates the second subsequent process, FIG. 7C illustrates the third subsequent process, and FIG. 7D illustrates the fourth subsequent process.

In the first subsequent process shown in FIG. 7A, resin is injected into a clearance defined between the movable mold 31 and the fixed mold 41 at the injection station 11. The movable mold 31 and the fixed mold 41, which correspond to the "mold 2" shown in FIG. 4, have been attached to the setup station 13 in the last second molding process. The pair of divided pieces P1 and P2 molded in the second-to-last second molding process is interposed between the movable mold 31 and the fixed mold 41. Therefore, as a result of injecting resin in the first subsequent process, the pair of divided pieces P1 and P2 is coupled with each other and whereby the hollow article P is molded.

In the first subsequent process, the movable mold 32 and the fixed mold 42 are on standby at the removing station 12. In other words, no special operation is performed for the movable mold 32 and the fixed mold 42 at the removing station 12. The movable mold 32 and the fixed mold 42, which correspond to the "mold 3" shown in FIG. 4, have been attached to the injection station 11 in the last second molding process. Thus, curing the pair of divided pieces P1 and P2 formed between the movable mold 32 and the fixed mold 42 proceeds.

In the first subsequent process, the inner mold 53 is interposed between the movable mold 33 and the fixed mold 43 at the setup station 13. The movable mold 33 and the fixed mold 43, which correspond to the "mold 1" shown in FIG. 4, have been attached to the removing station 12 in the last second molding process.

The rotation process is performed after the above-described first subsequent process. As a result, the movable mold 31 and the fixed mold 41 move from the injection station 11 to the removing station 12 together with the hollow article P. The movable mold 32 and the fixed mold 42 move from the removing station 12 to the setup station 13 together with the inner mold 52 and the pair of divided pieces P1 and P2. The movable mold 33 and the fixed mold 43 move from the setup station 13 to the injection station 11 together with the inner mold 53. The second subsequent process is performed after the rotation process is performed.

In the second subsequent process shown in FIG. 7B, the movable mold 31 and the fixed mold 41 are on standby at the injection station 11. In other words, the nozzle 23 does not inject resin into the clearance defined between the movable mold 31 and the fixed mold 41 in the second subsequent process. The movable mold 31 and the fixed mold 41, which correspond to the "mold 1" shown in FIG. 4, have been attached to the setup station 13 in the above-described first subsequent process.

In the second subsequent process, the hollow article P interposed between the movable mold 32 and the fixed mold 42 is taken out at the removing station 12. The movable mold 31 and the fixed mold 41, which correspond to the "mold 2" shown in FIG. 4, have been attached to the injection station 11 in the above-described first subsequent process. Thus, another hollow article P is molded and whereby the quantity N of manufactured hollow articles P increases by one and becomes Na−1.

In the second subsequent process, the inner mold 53 interposed between the movable mold 33 and the fixed mold 43 is removed at the setup station 13. The movable mold 33 and the fixed mold 43, which correspond to the "mold 3" shown in FIG. 4, have been attached to the removing station 12 in the above-described first subsequent process. The inner mold 53 is taken out while the two divided pieces P1 and P2 are left in the movable mold 33 and the fixed mold 43 respectively.

The rotation process is performed after the above-described second subsequent process. Specifically, the movable mold 31 and the fixed mold 41 move from the injection station to the removing station 12 together with the inner mold 51. The movable mold 32 and the fixed mold 42 move from the removing station 12 to the setup station 13. The movable mold 33 and the fixed mold 43 move from the setup station 13 to the injection station 11 together with the pair of divided pieces P1 and P2. The third subsequent process is performed after the rotation process is performed.

In the third subsequent process shown in FIG. 7C, resin is injected into a clearance defined between the movable mold 31 and the fixed mold 41 at the injection station 11. The movable mold 31 and the fixed mold 41, which correspond to the "mold 3" shown in FIG. 4, have been attached to the setup station 13 in the above-described second subsequent process. The pair of divided pieces P1 and P2 molded in the last second molding process is interposed between the movable mold 31 and the fixed mold 41. Therefore, as a result of injecting of resin in the third subsequent process, the pair of divided pieces P1 and P2 is coupled to each other and thereby forming the hollow article P.

In the third subsequent process, the movable mold 32 and the fixed mold 42 are on standby at the removing station 12. In other words, no special operation is performed for the movable mold 32 and the fixed mold 42 at the removing station 12. The movable mold 32 and the fixed mold 42, which correspond to the "mold 1" shown in FIG. 4, have been attached to the injection station 11 in the above-described second subsequent process.

In the third subsequent process, the inner mold 53 is interposed between the movable mold 33 and the fixed mold 43 at the setup station 13. The movable mold 33 and the fixed mold 43, which correspond to the "mold 2" shown in FIG. 4, have been attached to the removing station 12 in the above-described second subsequent process.

The rotation process is performed after the above-described third subsequent process. Specifically, the movable mold 31 and the fixed mold 41 move from the injection station 11 to the removing station 12 together with the hollow article P. The movable mold 32 and the fixed mold 42 move from the removing station 12 to the setup station 13 together with the inner mold 52. The movable mold 33 and the fixed mold 43 move from the setup station 13 to the injection station 11 together with the inner mold 53. The fourth subsequent process is performed after the rotation process is performed.

In the fourth subsequent process shown in FIG. 7D, the movable mold 31 and the fixed mold 41 are on standby at the injection station 11. In other words, the nozzle 23 does not inject resin into a clearance defined between the movable mold 31 and the fixed mold 41 in the fourth subsequent process. The movable mold 31 and the fixed mold 41, which correspond to the "mold 2" shown in FIG. 4, have been attached to the setup station 13 in the above-described third subsequent process.

In the fourth subsequent process, the hollow article P interposed between the movable mold 32 and the fixed mold 42 is taken out at the removing station 12. The movable mold 32 and the fixed mold 42, which correspond to the "mold 3" shown in FIG. 4, have been attached to the injection station 11 in the above-described third subsequent process. Thus, another hollow article P is molded and the quantity N of manufactured hollow articles P increases by one and becomes Na.

In the fourth subsequent process, the inner mold 53 interposed between the movable mold 33 and the fixed mold 43 is removed at the setup station 13. The movable mold 33 and the fixed mold 43, which correspond to the "mold 1" shown in FIG. 4, have been attached to the removing station 12 in the above-described third subsequent process.

According to the above-described method, in the second molding process, one pair of divided pieces P1 and P2 is molded by one of the three pairs of molds at the injection station 11 while one hollow article P is taken out from another one of the three pairs of molds at the removing station 12. The first molding process is performed again after the second molding process with the rotation process interposed therebetween. In the first molding process, another pair of divided pieces P1 and P2 is coupled to be another hollow article in the remaining one of the three pairs of molds at the injection station 11 while curing the one pair of divided pieces P1 and P2 by holding the one of the three pairs of molds 32 and 42 at the removing station 12. Thus, by performing the first molding process and the second molding process repeatedly with the rotate process interposed therebetween, a quantity of the hollow articles P provided per unit time can be uniform while the lead time can be shortened by using the inner mold 50 and the three pairs of the movable mold 30 and the fixed mold 40.

Here, a process chart of a method for manufacturing a hollow article according to a comparative example is shown in FIG. 10. The method in the comparative example is for manufacturing hollow articles P by using three pairs of movable mold 30 and fixed mold 40 and three inner molds 50.

In the method of the comparative example, combinations of processes to be performed are different from combinations of processes in the method of the first embodiment. As shown in FIG. 10, the method of the comparative example includes a third molding process, a fourth molding process, and a fifth molding process repeatedly performed with the rotation process interposed therebetween. The third molding process includes injecting resin into a mold 2. The fourth molding includes injecting resin into a mold 3. The fifth molding process includes injecting resin into a mold 1.

In the method of the comparative example, the movable mold 32 and the fixed mold 42 are held to be on standby at the removing station 12 in each of the third, fourth and fifth molding processes, and then the hollow article P is taken out in each of the subsequent third, fourth and fifth molding processes. That is, processes in which the hollow article P is not molded are performed continuously, and then subsequent processes in which the hollow article P is molded are performed continuously. As a result, a quantity of the hollow articles P manufactured per unit time may become un-uniform. When the quantity of the hollow articles P manufactured per unit time becomes un-uniform, a process for manufacturing an air flow meter including the hollow article P by a manufacturing device may not be performed continuously. Accordingly, manufacturing efficiency may deteriorate.

In contrast, in the method of the first embodiment, the first molding process and the second molding process are performed repeatedly with the rotation process interposed therebetween, and the hollow article P is provided in each second molding process. Accordingly, a quantity of the hollow articles P manufactured per unit time becomes uniform. As a result, subsequent processes for manufacturing an air flow meter using the hollow article P can be performed with high efficiency.

The manufacturing method in the first embodiment includes the first preceding process, the second preceding process, and the third preceding process performed in advance of the first molding process and the second molding process. In the first preceding process, (i) resin is injected into a clearance defined between the movable mold 31 and the fixed mold 41, which are fitted together with the inner mold 51 interposed therebetween, to mold a pair of divided pieces P1 and P2 at the injection station 11, (ii) the movable mold 32 and the fixed mold 42 are held to be on standby at the removing station 12, and (iii) the movable mold 33 and the fixed mold 43 are held to be on standby at the setup station 13. The second preceding process is performed after the first preceding process interposing the rotation process therebetween. In the second preceding process, (i) the movable mold 31 and the fixed mold 41 are held to be on standby at the injection station 11, (ii) the movable mold 32 and the fixed mold 42 are held to be on standby at the removing station 12, and (iii) the inner mold 53 is interposed between the movable mold 33 and the fixed mold 43 at the setup station 13. The third preceding process is performed after the second preceding process interposing the rotation process therebetween. In the third preceding process, (i) resin is injected into a clearance defined between the movable mold 31 and the fixed mold 41, which are fitted together with the inner mold 51 interposed therebetween, to mold a pair of divided pieces P1 and P2 at the injection station 11, (ii) the movable mold 32 and the fixed mold 42 are held to be on standby at the removing station 12, and (iii) the inner mold 53 interposed between the movable mold 33 and the fixed mold 43 is removed at the setup station 13.

By performing the first, second and third preceding processes as described above, the first molding process and the second molding process can be start from the state in which any one of the first, second and third pairs of the movable mold 30 and the fixed mold 40 has the divided pieces P1 and P2 and the hollow article P.

The method in the first embodiment includes the first subsequent process, the second subsequent process, the third subsequent process, and the fourth subsequent process performed after the second molding process. The first subsequent process is performed after the second molding process with the rotation process interposed therebetween. In the first subsequent process, (i) resin is injected into a clearance defined between the movable mold 31 and the fixed mold 41, which are fitted together without the inner mold 51 interposed therebetween, to couple the pair of divided pieces P1 and P2 at the injection station 11 and (ii) the movable mold 32 and the fixed mold 42 are held to be on standby at the removing station 12. The second subsequent process is performed after the first subsequent process with the rotation process interposed therebetween. In the second subsequent process, (i) the movable mold 31 and the fixed mold 41 are held to be on standby at the injection station 11, (ii) the hollow particle P formed between the movable mold 32 and the fixed mold 42 is taken out at the removing station 12, and (iii) the inner mold 53 interposed between the movable mold 33 and the fixed mold 43 is removed while leaving the pair of divided pieces P1 and P2 between the movable mold 33 and the fixed mold 43 at the setup station 13. The third subsequent process is performed after the second subsequent process with the rotation process interposed therebetween. In the third subsequent process, (i) resin is injected into a clearance defined between the movable mold 31 and the fixed mold 41, which are fitted together without the inner mold 51 interposed therebetween, to couple the pair of divided pieces P1 and P2 at the injection station 11, (ii) the movable mold 32 and the fixed mold 42 are held to be on standby at the removing station 12, and (iii) the inner mold 53 is interposed between the movable mold 33 and the fixed mold 43 at the setup station 13. The fourth subsequent process is performed after the third subsequent process with the rotation process interposed therebetween. In the fourth subsequent process, (i) the movable mold 31 and the fixed mold 41 are held to be on standby at the injection station 11 and (ii) the hollow article P formed between the movable mold 32 and the fixed mold 42 is taken out at the removing station 12.

By performing the first, second, third and fourth subsequent processes as described above, the method for manufacturing the hollow articles P is completed without leaving the pair of divided pieces P1 and P2 and the hollow article P in any one of the first, second and third pairs of movable mold 30 and fixed mold 40. Moreover, the first preceding process promptly starts in response to starting performing the method for manufacturing the hollow articles P.

The method for manufacturing the hollow article P in the first embodiment uses the first, second and third pairs of movable mold 30 and fixed mold 40 and the first and second inner molds 50 corresponding to the movable mold 30 and the fixed mold 40 respectively. The hollow article P molded by the first pair of molds 30 and 40, the hollow article P molded by the second pair of molds 30 and 40, and the hollow article P molded by the third pair of molds 30 and 40 have the same shape. Accordingly, the lead time can be shortened and the quantity of the hollow articles P manufactured per unit time can be uniform with a small quantity of pairs of the movable mold 30 and the fixed mold 40.

In the method of the first embodiment, the runner through which resin flows in the first molding process is different from the runner through which resin flows in the second molding process. That is, the runner through which resin flows to mold the pair of divided pieces P1 and P2 is different from the runner through which resin flows to couple the pair of divided pieces P1 and P2. As a result, resin can be supplied appropriately in each of the first molding process and the second molding process. Therefore, a quality of the manufactured hollow article P can be improved while shortening the lead time in manufacturing the hollow article P.

Second Embodiment

Next, a method for manufacturing hollow articles in a second embodiment will be described with reference to FIG. 8, FIG. 9A and FIG. 9B. In the method according to the second embodiment, similar to the method of the first embodiment, a hollow article is molded in a manner that a pair of divided pieces is molded and that the pair of divided pieces is coupled to form the hollow article. In the method of the second embodiment, a molding device 100 different from the molding device 10 used in the method of the first embodiment is used. The molding device 100 has the same components as the molding device 10, therefore the same components are assigned with the same reference numbers and a description thereof is omitted.

Figure 8:
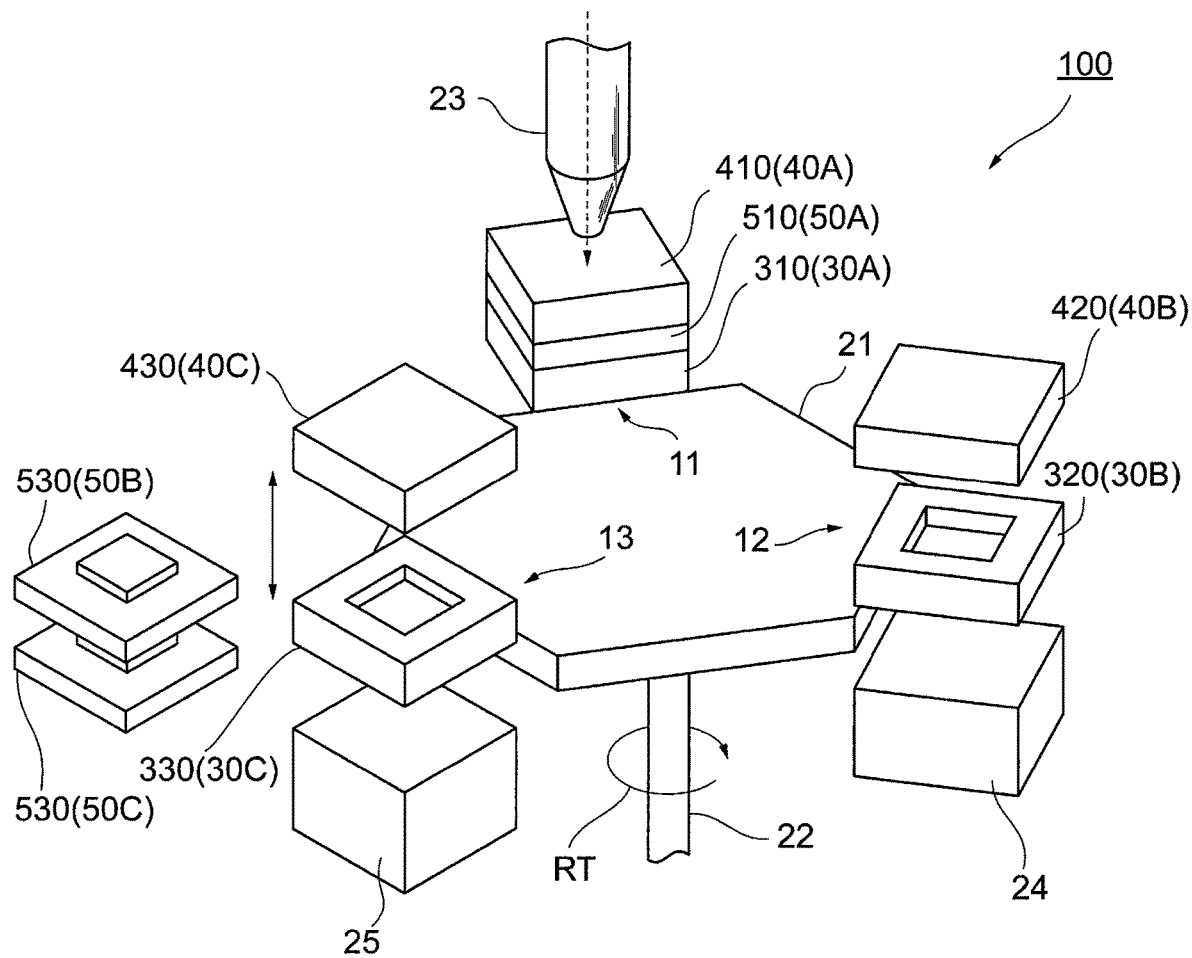
FIG. 8 is a perspective view of a molding device used in a method according to a second embodiment.

FIG. 8 is a perspective view illustrating the molding device 100 used in the manufacturing method according to the second embodiment. The molding device 100 includes the stage 21, the nozzle 23, a first pair of a movable mold 30A and a fixed mold 40A, a second pair of a movable mold 30B and a fixed mold 40B, a third pair of movable mold 30C and a fixed mold 40C, and first, second and third inner molds 50A, 50B and 50C.

The first pair of molds 30A and 40A, the second pair of molds 30B and 40B, and the third pair of molds 30C and 40C each molds a hollow article with resin injected from the nozzle 23. The movable molds 30A, 30B and 30C (or the first molds) are attached to a rim of the stage 21 at intervals of 120° in the direction of the arrow RT around the rotary shaft 22. The fixed molds 40A, 40B and 40C (or the second molds) are respectively positioned above the movable molds 30A, 30B and 30C. That is, the movable mold 30A is paired with the fixed mold 40A to be the first pair of molds, the movable mold 30B is paired with the fixed mold 40B to be the second pair of molds, and the movable mold 30C is paired with the fixed mold 40C to be the third pair of molds. A hollow article PA molded by the first pair of molds 30A and 40A, a hollow article PB molded by the second pair of molds 30B and 40B, and a hollow article PC molded by the third pair of molds 30C and 40C have different shapes from each other.

Each of the inner molds 50A, 50B, and 50C is also referred to as "core". The inner mold 50A is configured to be removably interposed between the movable mold 30A and the fixed mold 40A. The inner mold 50B is configured to be removably interposed between the movable mold 30B and the fixed mold 40B. The inner mold 50C is configured to be removably interposed between the movable mold 30C and the fixed mold 40C.

Hereafter, the movable mold, the fixed mold, and the inner mold attached to an injection station 11 will be respectively referred to as "movable mold 310", "fixed mold 410", and "inner mold 510". The movable mold, the fixed mold, and the inner mold attached to a removing station 12 will be respectively referred to as "movable mold 320", "fixed mold 420", and "inner mold 520". The movable mold, the fixed mold, and the inner mold attached to a setup station 13 will be respectively referred to as "movable mold 330", "fixed mold 430", and "inner mold 530".

In other words, the movable mold 310, the fixed mold 410, and the inner mold 510 move from the injection station 11 to the removing station 12 when the rotation process is performed, and thereby respectively becoming the movable mold 320, the fixed mold 420, and the inner mold 520 (not shown in FIG. 8). Similarly, the movable mold 320, the fixed mold 420, and the inner mold 520 (not shown in FIG. 8) move from the removing station 12 to the setup station 13 when the rotation process is performed, and thereby respectively becoming the movable mold 330, the fixed mold 430, and the inner mold 530. Similarly, the movable mold 330, the fixed mold 430, and the inner mold 530 move from the setup station 13 to the injection station 11 when the rotation process is performed, and thereby respectively becoming the movable mold 310, the fixed mold 410, and the inner mold 510.

Figure 9A:
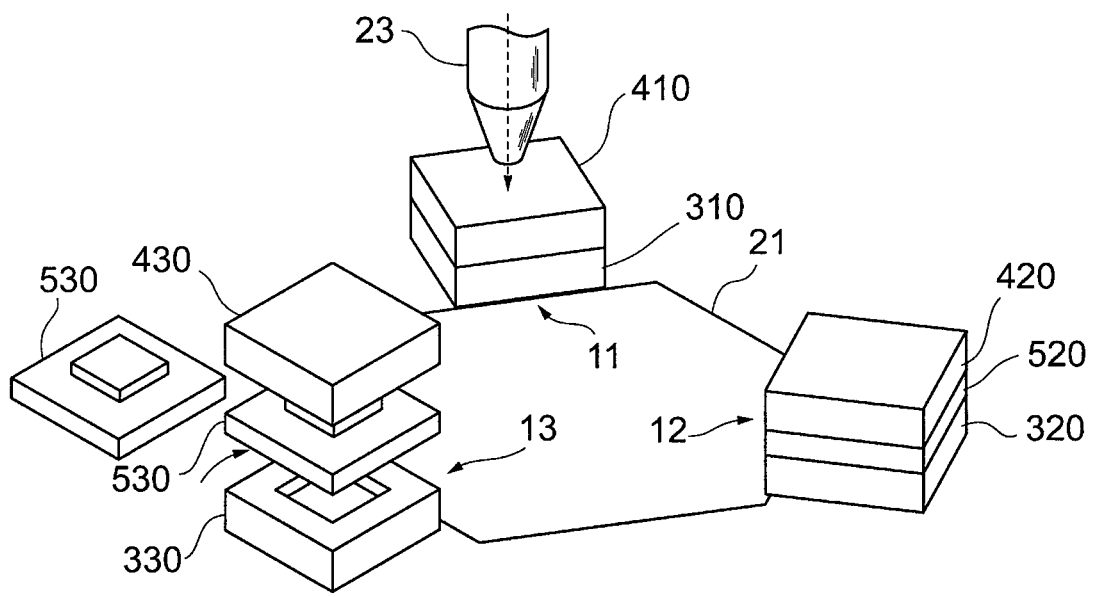
FIG. 9A is an explanatory diagram showing a first molding process according to the second embodiment.
Figure 9B:
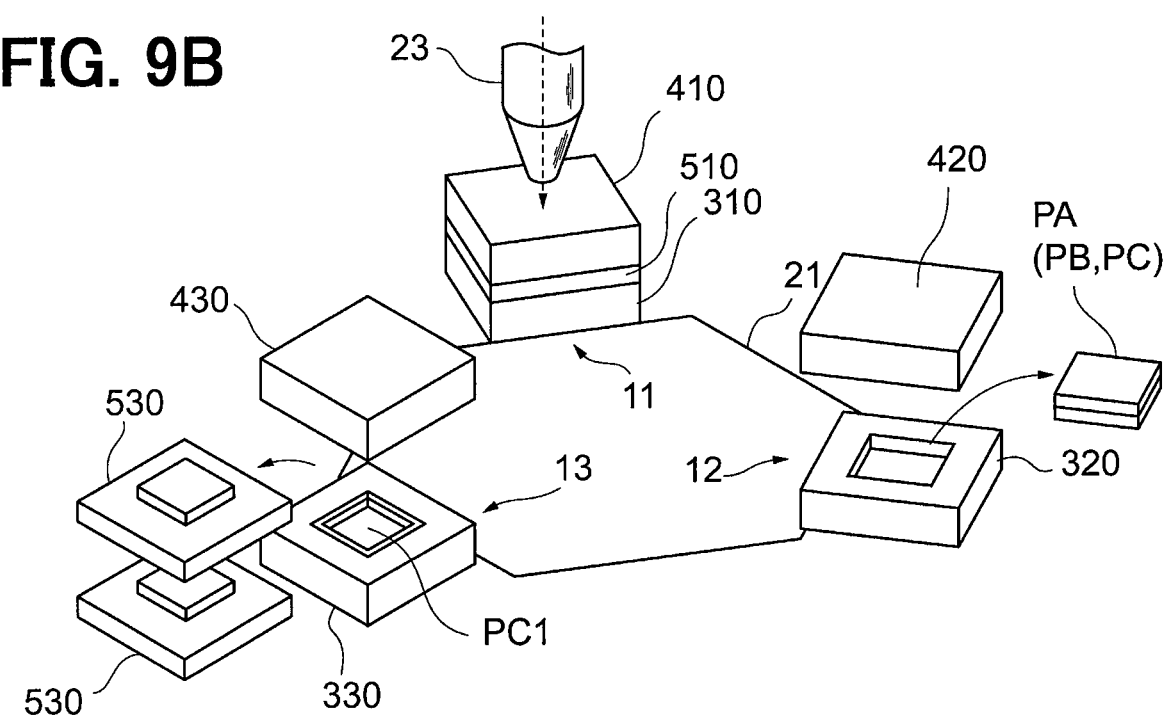
FIG. 9B is an explanatory diagram showing a second molding process according to the second embodiment.

FIGS. 9A and 9B illustrate a first molding process and a second molding process included in the manufacturing method performed by the molding device 100. FIG. 9A illustrates the first molding process and FIG. 9B illustrates the second molding process. The first molding process and the second molding process are performed repeatedly with the rotation process interposed therebetween.

In the first molding process shown in FIG. 9A, the resin is injected between the movable mold 310 and the fixed mold 410 at the injection station 11. A pair of divided pieces molded in the last second molding process is interposed between the movable mold 310 and the fixed mold 410. Therefore, as a result of injecting resin in the first molding process, the pair of divided pieces is coupled to each other to form the hollow article PA (or one of the hollow articles PB and PC).

In the first molding process, the movable mold 320, fixed mold 420, and the inner mold 520 are held to be on standby at the removing station 12. In other words, no special operation is performed for the movable mold 320 and the fixed mold 420 at the removing station 12. Thus, curing the pair of divided pieces formed between the movable mold 320 and the fixed mold 420 proceeds.

In the first molding process, the inner mold 530 is interposed between the movable mold 330 and the fixed mold 430 at the setup station 13. The inner mold 530 dedicates for the pair of the movable mold 330 and the fixed mold 430. In other words, when the pair of molds attached to the setup station 13 is the movable mold 30A and the fixed mold 40A, the inner mold 50A is interposed between the movable mold 30A and the fixed mold 40A. When the pair of molds attached to the setup station 13 is the movable mold 30B and the fixed mold 40B, the inner mold 50B is interposed between the movable mold 30B and the fixed mold 40B. When the pair of molds attached to the setup station 13 is the movable mold 30C and the fixed mold 40C, the inner mold 50C is interposed between the movable mold 30C and the fixed mold 40C.

The rotation process is performed after the above-described first molding process. In the rotation process, (i) the movable mold 310 and the fixed mold 410 moves from the injection station 11 to the removing station 12 together with the hollow article PA (or one of the hollow articles PB and PC) interposed therebetween, (ii) the movable mold 320 and the fixed mold 420 move from the removing station 12 to the setup station 13 together with the pair of divided pieces interposed therebetween, and (iii) the movable mold 330 and the fixed mold 430 move from the setup station 13 to the injection station 11 together with the inner mold 530 interposed therebetween. The second molding process is performed after the rotation process.

In the second molding process shown in FIG. 9B, the resin is injected into a clearance defined between the movable mold 310 and the fixed mold 410 fitted together with the inner mold 510 positioned therebetween at the injection station 11. The movable mold 310, the fixed mold 410, and the inner mold 510 have been attached to the setup station 13 in the above-described first molding process. Thus, the pair of divided pieces is molded between the movable mold 310 and the fixed mold 410.

In the second molding process, the hollow article PA (or one of the hollow articles PB and PC) interposed between the movable mold 320 and the fixed mold 420 is taken out at the removing station 12. The movable mold 320 and the fixed mold 420 have been attached to the injection station 11 in the above-described first molding process. Here, when the pair of molds attached to the removing station 12 is the movable mold 30A and the fixed mold 40A, the hollow article PA interposed between the movable mold 30A and the fixed mold 40A is taken out. When the pair of molds attached to the removing station 12 is the movable mold 30B and the fixed mold 40B, the hollow article PB interposed between the movable mold 30B and the fixed mold 40B is taken out. When the pair of molds attached to the removing station 12 is the movable mold 30C and the fixed mold 40C, the hollow article PC interposed between the movable mold 30C and the fixed mold 40C is taken out.

In the second molding process, the inner mold 530 interposed between the movable mold 330 and the fixed mold 430 is taken out at the setup station 13. The movable mold 330, the fixed mold 430, and the inner mold 530 have been attached to the removing station 12 in the above-described first molding process. The inner mold 530 taken out here dedicates for the movable mold 330 and the fixed mold 430. In other words, when the pair of molds attached to the setup station is the movable mold 30A and the fixed mold 40A, the inner mold 50A interposed between the movable mold 30A and the fixed mold 40A is removed. When the pair of molds attached to the setup station 13 is the movable mold 30B and the fixed mold 40B, the inner mold 50B interposed between the movable mold 30B and the fixed mold 40B is removed. When the pair of molds attached to the setup station 13 is the movable mold 30C and the fixed mold 40C, the inner mold 50C interposed between the movable mold 30C and the fixed mold 40C is removed. The inner mold 530 is taken out while the pair of divided pieces (e.g., the divided pieces PC1 in FIG. 9B) is left in the movable mold 330 and the fixed mold 430.

The rotation process is performed after the above-described second molding process. In the rotation process, (i) the movable mold 310 and the fixed mold 410 move from the injection station 11 to the removing station 12 together with the inner mold 510 and the pair of divided pieces interposed therebetween, (ii) the movable mold 320 and the fixed mold 420 move from the removing station 12 to the setup station 13, and (iii) the movable mold 330 and the fixed mold 430 move from the setup station 13 to the injection station 11 together with the pair of divided pieces interposed therebetween. The first molding process is performed again after the rotation process is performed.

As described above, in the second embodiment, the method uses the first inner mold 50A, the second inner mold 50B, and the third inner mold 50C corresponding to the first pair of molds 30A and 40A, the second pair of molds 30B and 40B, and the third pair of molds 30C and 40C respectively. The hollow article PA molded by the first pair of molds 30A and 40A, the hollow article PB molded by the second pair of molds 30B and 40B, and the hollow article PC molded by the third pair of molds 30C and 40C have different shapes from each other. According to the method in the second embodiment, the quantity of the hollow articles manufactured per unit time can be uniform while manufacturing three kinds of the hollow articles PA, PB and PC.

Other Embodiment

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

In each of the above-described embodiments, the first mold is the movable mold and the second mold is the fixed mold. However, a first mold may be a fixed mold and a second mold may be a movable mold. Both of a first mold and a second mold may be movable molds.

In each of the above-described embodiments, the manufactured hollow article is used for the air flow meter as an example. However, the present disclosure can be applied to manufacturing of hollow articles used for other products such as a container for storing liquid.

What is claimed is:

1. A method for manufacturing a hollow article by using a plurality of inner molds and three pairs of a first mold and a second mold, the method comprising
 a first molding process and a second molding process performed repeatedly with a rotation process interposed therebetween, wherein
 the first molding process includes
  injecting resin into a first clearance defined between a first pair of the three pairs of molds to couple a first pair of divided pieces formed in the first pair of the three pairs of molds to be a first hollow article when the first pair of the three pairs of molds is located at an injection station, wherein the first pair of the three pairs of molds is fitted together without any one of the plurality of inner molds,
  inserting a first one of the plurality of inner molds between a second pair of the three pairs of molds when the second pair of the three pairs of molds is located at a setup station,
  holding a third pair of the three pairs of molds when the third pair of the three pairs of the molds is located at a removing station, wherein a second one of the plurality of inner molds is interposed between the third pair of the three pairs of molds, and
 in the rotation process,
  the first pair of the three pairs of molds located at the injection station is moved to the removing station,
  the third pair of the three pairs of molds located at the removing station is moved to the setup station, and
  the second pair of the three pairs of molds located at the setup station is moved to the injection station, and
 the second molding process includes
  injecting resin into a second clearance defined between the second pair of the three pairs of molds located at the injection station, which is fitted together with the first one of the plurality of inner molds interposed therebetween, to mold a third pair of divided pieces,
  taking out the first hollow article from the first pair of the three pairs of molds located at the removing station, and
  removing the second one of the plurality of inner molds from the third pair of the three pairs of molds located at the setup station while leaving a second pair of divided pieces therebetween.

2. The method for manufacturing the hollow article according to claim 1, the method further comprising:
 a first preceding process;
 a second preceding process performed after the first preceding process with the rotation process interposed therebetween; and
 a third preceding process performed after the second preceding process with the rotation process interposed therebetween, wherein
 the first, second and third preceding processes are performed in advance of the first and second molding processes,
 the first preceding process includes
  injecting resin into a third clearance defined between the first pair of the three pairs of molds located at the injection station, which is fitted together with a third one of the plurality of inner molds interposed therebetween, to mold the first pair of divided pieces,
  holding the third pair of the three pairs of molds located at the removing station, and
  holding the second pair of the three pairs of molds located at the setup station, the second preceding process includes
- holding the second pair of the three pairs of molds located at the injection station,
- inserting the second one of the plurality of inner molds between the third pair of the three pairs of molds located at the setup station, and
- holding the first pair of the three pairs of molds located at the removing station together with the third one of the plurality of inner molds, and the third preceding process includes
- injecting resin into a fourth clearance defined between the third pair of the three pairs of molds located at the injection station, which is fitted together with the second one of the plurality of inner molds interposed therebetween, to mold the second pair of divided pieces,
- holding the second pair of the three pairs of molds located at the removing station, and
- removing the third one of the plurality of inner molds from the first pair of the three pairs of molds located at the setup station while leaving the first pair of divided pieces therebetween.

3. The method for manufacturing a hollow article according to claim 2, the method further comprising:
- a first subsequent process performed after the second molding process with the rotation process interposed therebetween;
- a second subsequent process performed after the first subsequent process with the rotation process interposed therebetween;
- a third subsequent process performed after the second subsequent process with the rotation process interposed therebetween; and
- a fourth subsequent process performed after the third subsequent process with the rotation process interposed therebetween, wherein the first subsequent process includes
- injecting resin into a fifth clearance defined between the third pair of the three pairs of molds located at the injection station, which is fitted together without any one of the plurality of inner molds, to couple the second pair of divided pieces to be a second hollow article, and
- holding the second pair of the three pairs of molds located at the removing station together with the first one of the plurality of inner molds, the second subsequent process includes
- holding the first pair of the three pairs of molds located at the injection station,
- taking out the second hollow article from the third pair of the three pairs of molds located at the removing station, and
- removing the first one of the plurality of inner molds from the second pair of the three pairs of molds located at the setup station while leaving the third pair of divided pieces therebetween, the third subsequent process includes
- injecting resin into a sixth clearance defined between the second pair of the three pairs of molds located at the injection station, which is fitted together without any one of the plurality of inner molds, to couple the third pair of divided pieces to be a third hollow article,
- holding the first pair of the three pairs of molds located at the removing station, and
- inserting a fourth one of the plurality of inner molds between the third pair of the three pairs of molds located at the setup station, and the fourth subsequent process includes
- holding the third pair of the three pairs of molds located at the injection station, and
- taking out the third hollow article from the second pair of the three pairs of molds located at the removing station.

4. The method for manufacturing a hollow article according to claim 1, wherein
the hollow article molded by each of the three pairs of molds has the same shape.

5. The method for manufacturing the hollow article according to claim 1, wherein
the hollow article molded by each of the three pairs of molds has a different shape from each other.

6. The method for manufacturing a hollow article according to claim 1, wherein a runner through which the resin flows in the first molding process is different from a runner through which the resin flows in the second molding process.

* * * * *